(12) United States Patent
Rashid et al.

(10) Patent No.: US 9,357,582 B2
(45) Date of Patent: May 31, 2016

(54) SIMULTANEOUS SECONDARY-CELL RELEASE FOR LICENSED SHARED ACCESS

(71) Applicant: Intel Corporation, Santa Clara, CA (US)

(72) Inventors: Mohammad Mamunur Rashid, Hillsboro, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/309,370

(22) Filed: Jun. 19, 2014

(65) Prior Publication Data

US 2015/0373776 A1 Dec. 24, 2015

(51) Int. Cl.
*H04W 72/00* (2009.01)
*H04W 76/06* (2009.01)

(52) U.S. Cl.
CPC .................................. *H04W 76/064* (2013.01)

(58) Field of Classification Search
CPC . H04W 48/16; H04W 28/06; H04W 36/0083; H04W 48/20; H04W 8/005; H04W 36/04; H04W 84/045; H04W 88/06
USPC ........................ 455/452.2, 453, 454, 460, 450
See application file for complete search history.

(56) References Cited

U.S. PATENT DOCUMENTS

| | | | |
|---|---|---|---|
| 8,892,113 B2 * | 11/2014 | Ratasuk | H04W 72/0486 455/452.2 |
| 2012/0106510 A1 | 5/2012 | Kuo | |
| 2012/0282942 A1 | 11/2012 | Uusitalo et al. | |
| 2013/0165134 A1 | 6/2013 | Touag et al. | |
| 2013/0344869 A1 | 12/2013 | Yamada | |

OTHER PUBLICATIONS

"International Application Serial No. PCT/US2015/031520, International Search Report mailed Jul. 7, 2015", 3 pgs.
"International Application Serial No. PCT/US2015/031520, Written Opinion mailed Jul. 7, 2015", 5 pgs.

* cited by examiner

*Primary Examiner* — Amancio Gonzalez
(74) *Attorney, Agent, or Firm* — Schwegman, Lundberg & Woessner, P.A.

(57) ABSTRACT

A 3GPP LTE protocol enhancement realizes the full benefit of dynamic frequency sharing systems by enhancing current Secondary-Cell (SCell) release mechanisms to support Licensed Shared Access (LSA) when LSA frequency bands are reclaimed. An enhanced signaling mechanism to reduces over-the-air signaling overhead in Carrier Aggregated enabled Evolved Node Bs by using broadcast messages rather than generating individual message exchanges with each User Equipment (UE) for release of SCells. A UE comprises a processor and transceiver configured to receive, on a Licensed Shared Access (LSA) frequency band, a broadcast paging message indicating transmission of a System Information Block 2 carrying Radio Resource Control (RRC) information in a next modification period, receive the SIB2 on the LSA frequency band, wherein the radio resource control information comprises a list of excluded SCells, read the list of excluded SCells, and reconfigure RRC connection information to release SCells identified in the list of excluded SCells.

20 Claims, 6 Drawing Sheets

SIMULTANEOUS SECONDARY-CELL RELEASE FOR LICENSED SHARED ACCESS

TECHNICAL FEILD

Examples generally relate to Long Term Evolution (LTE) networks. One or more examples relate to the implementation of Licensed Shared Access (LSA) in LTE networks.

BACKGROUND

Wireless communication systems are widely deployed to provide various types of communication content such as voice, data, and other media. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems. All multiple access wireless communication systems require sufficient access to available radio spectrum for supporting bearer service requirements.

Licensed Shared Access (LSA) is a new innovative framework that enables more efficient usage of available spectrum by allowing coordinated shared access to licensed spectrum for addressing spectrum shortage. Currently, there is no protocol or signaling mechanism provided in the 3GPP LTE standard for efficient release of Carrier Aggregation (CA) Secondary-Cells (SCell)s during LSA reclamation by owner incumbents. Thus, in order to realize the full benefit of proposed dynamic frequency sharing systems, there is now a need for enhancements in current 3GPP LTE standards to enable efficient CA SCell release during LSA reclamation.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DECRIPTION OF EMBODIMENTS

Figure 1:
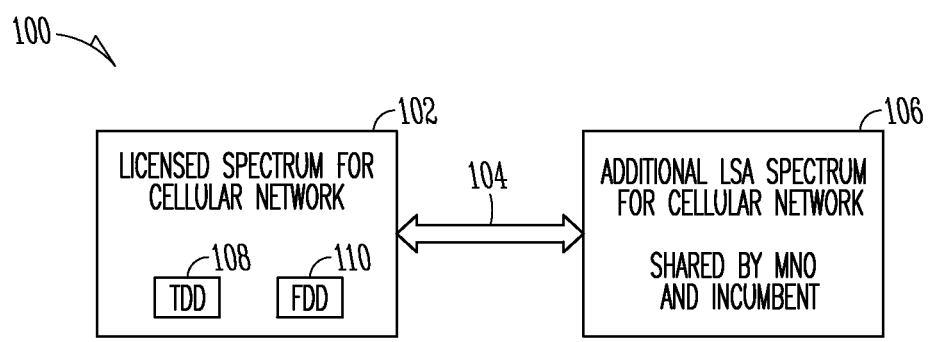
FIG. 1 shows a high level block diagram illustrating an example of dynamic frequency sharing in a cellular network, according to some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The word "exemplary" is used herein to mean "serving as an example, instance, or illustration." Any embodiment described herein as "exemplary" is not necessarily to be construed as preferred or advantageous over other embodiments.

The terms "communication station", "station", "handheld device", "mobile device", "wireless device" and "User Equipment" (UE) as used herein refers to a wireless communication device such as a cellular telephone, smartphone, tablet, netbook, wireless terminal, laptop computer, femtocell, High Data Rate (HDR) subscriber station, access point, access terminal, or other personal communication system (PCS) device. The device may be either mobile or stationary.

The term "access point" as used herein may be a fixed station. An access point may also be referred to as an access node, a base station or some other similar terminology known in the art. An access terminal may also be called a mobile station, a User Equipment (UE), a wireless communication device or some other similar terminology known in the art.

The terms "relinquish", "release" and "return" are used herein to mean the surrender of LSA spectrum to its incumbent.

Cellular networks, such as LTE, can allow a device to connect to or communicate with other devices. Modern LTE networks can include both large and small cells configured in a Heterogeneous Network (HetNet) configuration. The base stations, or Evolved Node Bs (eNB)s, of large and small cells can be configured to operate on different frequency bands. Frequency band(s), i.e., spectrum, adequate for the various types of communication content is required for a base station to connect to, or communicate with, other devices.

Licensed Shared Access (LSA) can significantly enhance the capacity of 3GPP LTE systems by providing a mechanism to extend available spectrum. Currently, a number of LTE compatible spectrum bands (e.g. 100 MHz in 2.3 GHz band, 100+ MHz in 2.6 GHz band) are being considered for LSA application. An LSA spectrum sharing framework is strongly backed and urgently awaited by major wireless equipment vendors, operators, regulators, government bodies and standardization bodies. In this framework, an incumbent spectrum holder allows coordinated shared access to an unused portion of its licensed spectrum by a group of secondary users (i.e., network operators), such that a large portion of wireless spectrum that otherwise remains unused becomes available to network operators for meeting the ever increasing traffic demand over LTE networks.

In spite of ongoing innovation to extract greater throughput and data rates from the available spectrum, projected traffic growth indicates that mobile broadband operators will no longer be able to meet demand with their fixed licensed spectrum because the pool of available spectrum for licensing is limited and cannot grow with the increasing demand. The LSA framework addresses this limitation by allowing an incumbent user, also known as a Primary Spectrum Holder (PSH), to share coordinated access to an unused portion of its licensed spectrum with a group of secondary spectrum holders (SSH). The PSH however retains exclusive right to the spectrum and can reclaim the spectrum from SSHs. When using the LSA framework to acquire supplemental spectrum, LTE networks are required to adapt to the dynamic nature of the available spectrum by gracefully accommodating spectrum reclamations by PSHs. An LTE base station E Node B (eNB) releases the LSA band once it is notified of an upcoming reclamation by the PSH.

CA is an ideal technique for utilizing the additional bandwidth that becomes dynamically available to LTE networks through LSA. CA offers vastly increased peak data rate, improved load balancing among available spectrum bands, and major reduction of signaling overhead and service disruptions during UE handovers from LSA frequency bands to primary LTE bands because CA allows the primary LTE frequency band to be used for a Primary Cell (PCell) while LSA bands are added as secondary cells (SCells) as they become available.

When utilizing a LSA framework, an ideally designed LTE network gracefully accommodates dynamic release of LSA frequency bands to incumbent spectrum holders, who retain exclusive rights to the LSA spectrum, when the incumbent reclaims the spectrum from secondary users as necessary or in accordance with some spectrum sharing agreement. During LSA frequency band reclamation events, CA capable UEs configured to use a LSA frequency band as a SCell are reconfigured to vacate and release the SCell.

Without modification to current 3GPP LTE specifications, the eNB inefficiently transmits individual Radio Resource Control (RRC) Connection Reconfiguration messages carrying information for SCell release, which also cause individual message responses from receiving UEs. These individual message exchanges between the eNB and UEs create a large spike in over-the-air signaling overhead as the number of affected UEs may be quite large, propagating detrimental system performance effects and negative user experiences during LSA reclamation events.

Unfortunately, current 3GPP LTE specifications do not provide signaling and protocol support for efficient release of CA SCells during LSA reclamation by incumbents. Simultaneous Secondary-Cell Release For Licensed Shared Access enhances the current 3GPP LTE framework by incorporating an enhanced signaling and broadcast messaging methodology, rather than transmitting numerous individual messages to, and receiving individual responses from, all of the UEs configured on the affected SCells. More specifically, an enhancement to the current SCell release model providing mechanisms to reduce over-the-air signaling overhead during LSA spectrum release in CA enabled eNBs is detailed in FIGS. 1-6.

FIG. 1 shows a high level block diagram illustrating an example of dynamic LSA frequency sharing in a cellular network. FIG. 1 depicts an example of a system 100 that comprises a primary (legacy) LTE band 102 receiving spectrum from or returning spectrum to, at arrow 104, additional LSA frequency band 106. The primary LTE band 102 may include a Time Division Duplexing (TDD) band 108 or a Frequency Division Duplexing (FDD) band 110. The additional spectrum from the additional LSA frequency band 106 may also be TDD or FDD bands.

Figure 2:
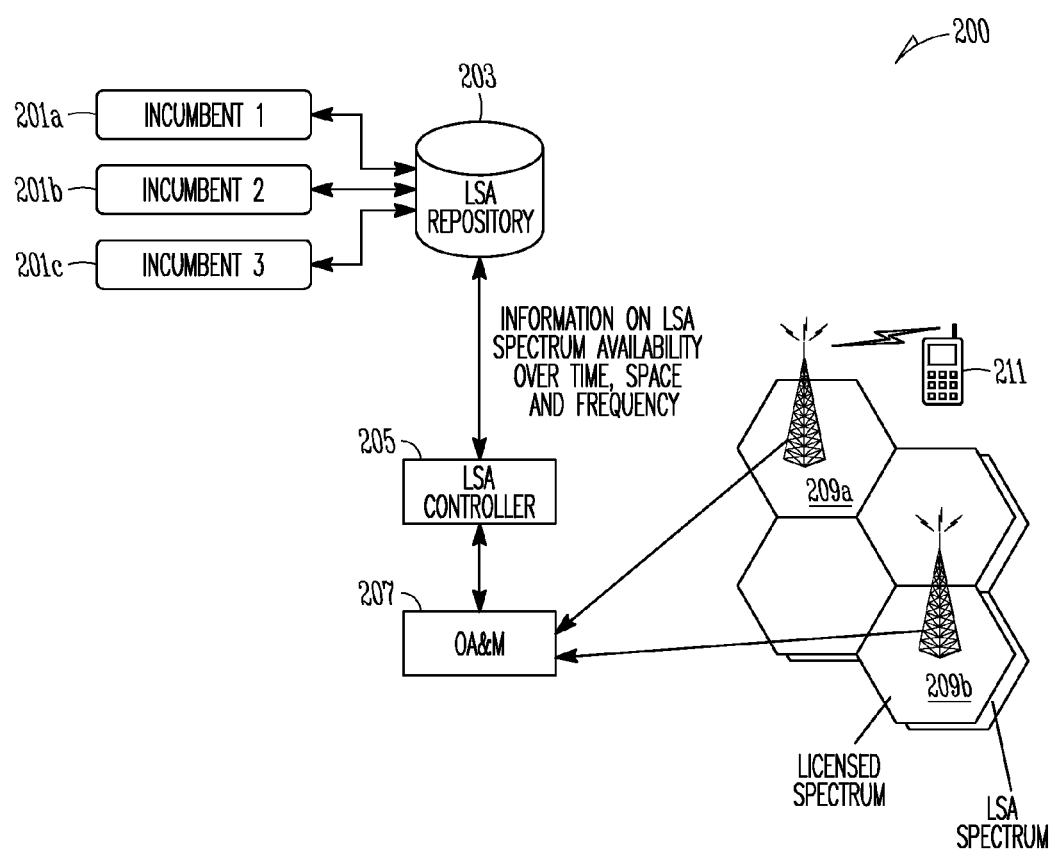
FIG. 2 shows a high level diagram illustrating an exemplary LSA system, according to some embodiments.

FIG. 2 shows a high level diagram illustrating an exemplary traditional Licensed Shared Access (LSA) system 200. In a traditional LSA system, incumbents 201a-c are original spectrum owners. An LSA Repository 203 is a data-base containing information on spectrum availability and shorter term aspects of spectrum sharing. The LSA Repository 203 is communicatively coupled to an LSA controller 205, which performs information management and translates LSA Repository 203 data base contents into spectrum access conditions for LSA frequency licensees, while an Operator Administration and Management (OA&M) 207 provides operations, administration, and management for the network operator's network. The OA&M 207 manages limited short term additional spectrum for the network operator's eNBs, or base stations, 209a-b serving User Equipment(s) 211.

Figure 3:
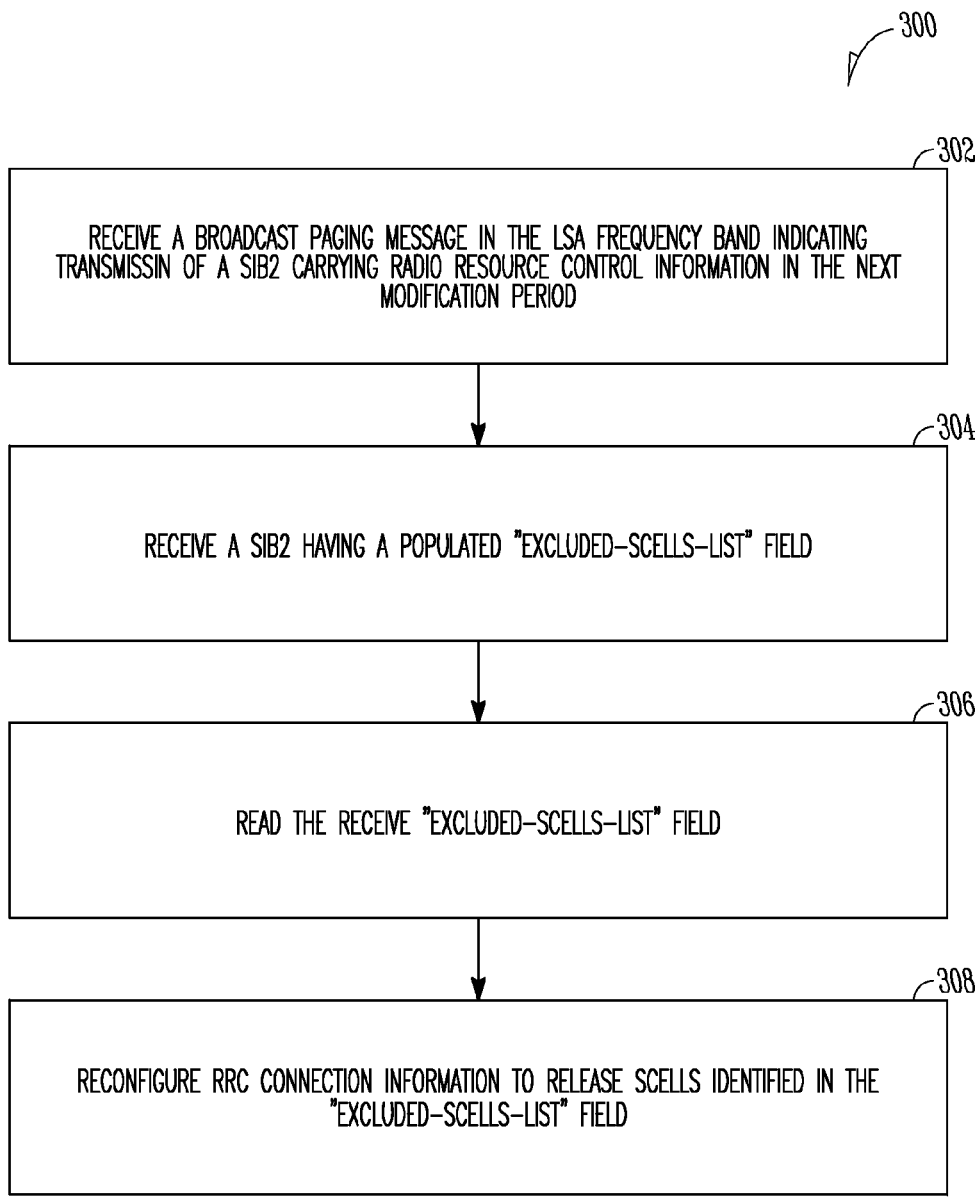
FIG. 3 is a high level overview flowchart of Simultaneous Secondary-Cell Release For Licensed Shared Access, according to some embodiments.

FIG. 3 is a high level overview block flowchart of Simultaneous Secondary-Cell Release For Licensed Shared Access 300, according to some embodiments that enhance current 3GPP LTE SCell release models by incorporating a mechanism for reducing over-the-air signaling overhead that leverages broadcast messaging rather than generating a large volume of individual message exchanges for releasing SCells on LSA frequency bands 106, since all the affected UEs 211 release the SCells on the same LSA bands at the same time. The disclosed signaling mechanism comprises a simple enhancement to the System Information Block 2 (SIB2) message structure, which incorporates an optional field, "excluded-SCells-list" for conveying information on SCells to be released.

When acquiring the LSA frequency band 106, the eNB 209 configures its CA capable UEs 211 to add this LSA frequency band 106 band as a SCell, while retaining the primary LTE band 102 as the PCell. The eNB 209 may utilize multiple LSA bands such that the UEs 211 could be configured with multiple SCells. When the LTE network releases a LSA frequency band 106 in its usage because of a reclamation request received from an incumbent or due to a predefined spectrum sharing agreement, the eNB 209 directs any SCell configured UE 211 on that LSA frequency band 106 to release the SCell. Current 3GPP LTE standards utilize dedicated "RRCConnectionReconfiguration" control messages to instruct individual UEs 211 to release a SCell comprising a SCellToReleaseList-r10 field containing information for SCells being released by the UEs 211. The "RRCConnectionReconfiguration" messages trigger an individual "RRCConnectionReconfigurationComplete" message response from each of the target UEs 211 connected to the affected SCell.

In contrast, Simultaneous Secondary-Cell Release for LSA conveys information about SCells to be released to UEs 211 by paging message in a new optional SIB2 field "excluded-SCells-list". In an exemplary embodiment, a SIB2 includes the enhancement shown in bold below:

```
"SystemInformationBlockType2-v9e0-IEs ::= SEQUENCE {
    ul-CarrierFreq-v9e0                 ARFCN-ValueEDTRA-v9e0
    OPTIONAL,  -- Cond ul- FreqMax
    nonCriticalExtension                SystemInformationBlockType2-vXeX-
IEs OPTIONAL      -- Need OP
}
SystemInformationBlockType2-vXeX-IEs ::= SEQUENCE {
    excluded-SCells-list                SEQUENCE (SIZE (1..maxSCells)) OF
SCellInfo        OPTIONAL,   -- Need ON
    nonCriticalExtension                SEQUENCE { }
    OPTIONAL  -- Need OP
}"
```

When an eNB 209 is directed to release an LSA band, it conveys this upcoming change of SCell availability by first transmitting a paging message to all its affected UEs 211 with the systemInfoModification flag field set, in accordance with clause 5.2.1.3 clause of standard 3GPP TS 36.331. The eNB 209 then modifies an enhanced SIB2 by populating and inserting the novel "excluded-SCells-list" field, for broadcast in a next modification period. The UEs 211 receive and read the modified SIB2 having the populated excluded-SCells-list field during the next modification period. Upon reading the excluded-SCells-list field, the UEs 211 reconfigure their RRC connection information to release the SCells identified in that field. The eNB 209 removes the excluded-SCells-list from the SIB2 at the conclusion of the current modification period to avoid unnecessary signaling overhead. As SCells can only be added through explicit messaging from the eNB 209, the UEs 211 determine that the released SCells are unavailable unless an explicit availability message is received from the eNB 209. Thus, no action by UEs 211 is necessary when the excluded-SCells-list field is absent from a received SIB2.

Simultaneous Secondary-Cell Release for LSA begins in operation 302 when the UE 211 receives a broadcast paging message in the LSA frequency band 106 indicating transmission of a SIB2 carrying RRC modification information in the next modification period. The UE 211 then receives a SIB2 having a populated "excluded-SCells-list" field in operation 304. The UE 211 reads the received "excluded-SCells-list" field in operation 306 and reconfigures its RRC connection information to release SCells identified in the "excluded-SCells-list" field in operation 308.

Figure 4:
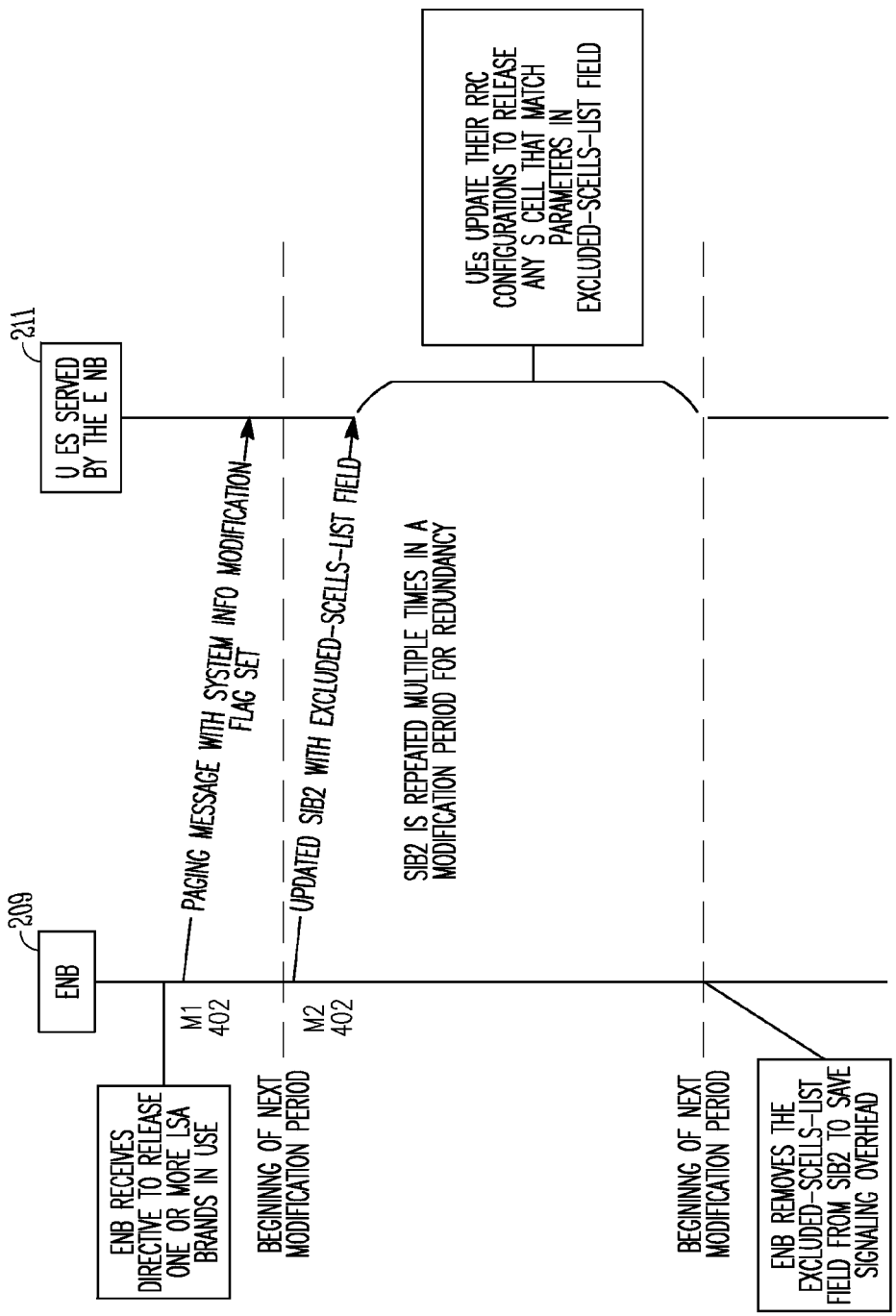
FIG. 4 illustrates an exemplary procedure for Simultaneous Secondary-Cell Release For Licensed Shared Access according to some embodiments.

FIG. 4 depicts a messaging procedure diagram of a signaling and messaging mechanism for achieving simultaneous SCell release in response to an impending loss of reclaimed LSA frequency band 106 resources, performed by a UE 211 arranged to send and receive messages M1 and M2 as illustrated.

An eNB 209 transmits a broadcast paging message, M1 402, in the LSA frequency band indicating transmission of a SIB2 carrying radio resource configuration modification information in the next modification period in message. The eNB 209 then transmits a SIB2 message, M2 404, having a populated "excluded-SCells-list" field. Transmission of the SIB2 message, M2 404 may be repeated one or more times for robust redundancy.

The UE 211 updates its RCC configuration to release any SCell identified in the excluded SCells list field. The eNB 209 then removes the excluded SCells list from future transmission of SIB2 messages to reduce signaling overhead.

Thus, over-the-air signaling overhead is minimized by utilizing broadcast signaling rather than individual reconfiguration messages for instructing UEs 211 to release SCells during LSA frequency band 106 reclamation events, benefitting from a configuration where all the affected UEs need to release the SCells on the same LSA bands at the same time.

Figure 5:
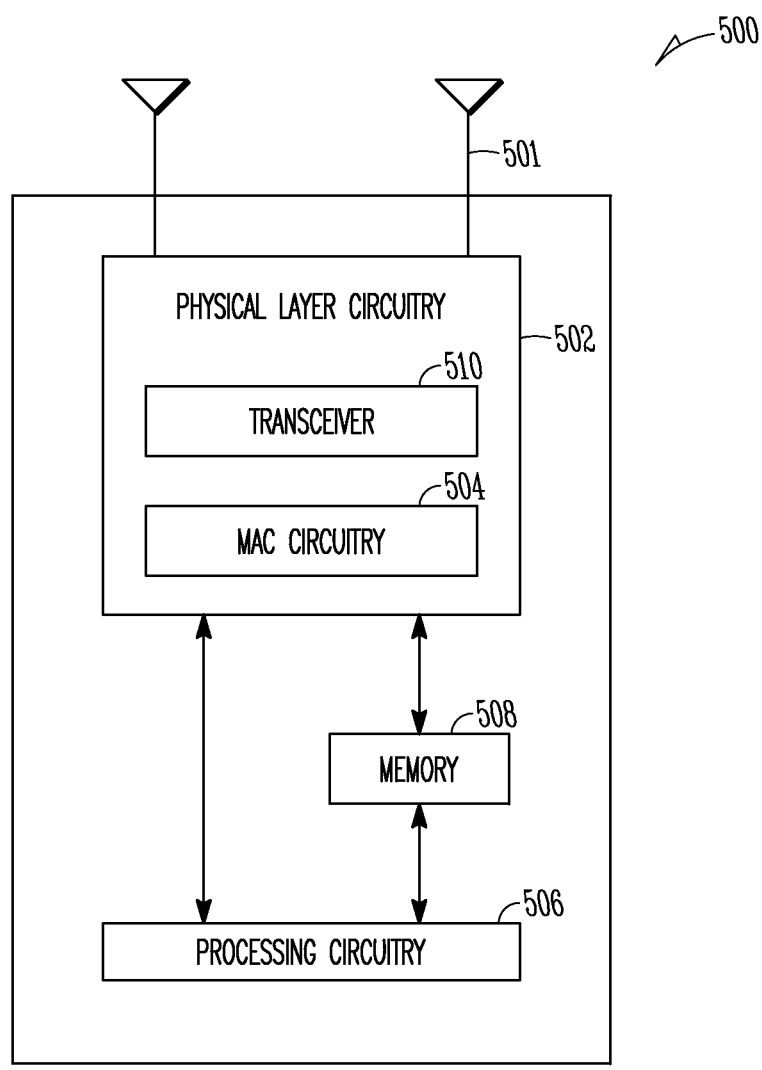
FIG. 5 shows a functional diagram of an exemplary communication station in accordance with some embodiments.

FIG. 5 shows a functional diagram of an exemplary communication station 500 in accordance with some embodiments. In one embodiment, FIG. 5 illustrates a functional block diagram of a communication station 500 that may be suitable for use as an eNB 209 or UE 211 (FIG. 2) in accordance with some embodiments. The communication station 500 may also be suitable for use as a handheld device, mobile device, cellular telephone, smartphone, tablet, netbook, wireless terminal, laptop computer, femtocell, High Data Rate (HDR) subscriber station, access point, access terminal, or other personal communication system (PCS) device.

The communication station 500 may include physical layer circuitry 502 having a transceiver 510 for transmitting and receiving signals to and from other communication stations using one or more antennas 501. The physical layer circuitry 502 may also comprise medium access control (MAC) circuitry 504 for controlling access to the wireless medium. The communication station 500 may also include processing circuitry 506 and memory 508 arranged to perform the operations described herein. In some embodiments, the physical layer circuitry 502 and the processing circuitry 506 may be configured to perform operations detailed in FIGS. 3 and 4.

In accordance with some embodiments, the MAC circuitry 504 may be arranged to contend for a wireless medium and configure frames or packets for communicating over the wireless medium, and the physical layer circuitry 502 may be arranged to transmit and receive signals. The physical layer circuitry 502 may include circuitry for modulation/demodulation, upconversion/downconversion, filtering, amplification, etc. In some embodiments, the processing circuitry 506 of the communication station 500 may include one or more processors. In some embodiments, two or more antennas 501 may be coupled to the physical layer circuitry 502 arranged for sending and receiving signals. The memory 508 may store information for configuring the processing circuitry 506 to perform operations for configuring and transmitting message frames and performing the various operations described herein. The memory 508 may comprise any type of memory, including non-transitory memory, for storing information in a form readable by a machine (e.g., a computer). For example, the memory 508 may comprise a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or another device that may receive and/or transmit information wirelessly.

In some embodiments, the communication station 500 may include one or more antennas 501. The antennas 501 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

Figure 6:
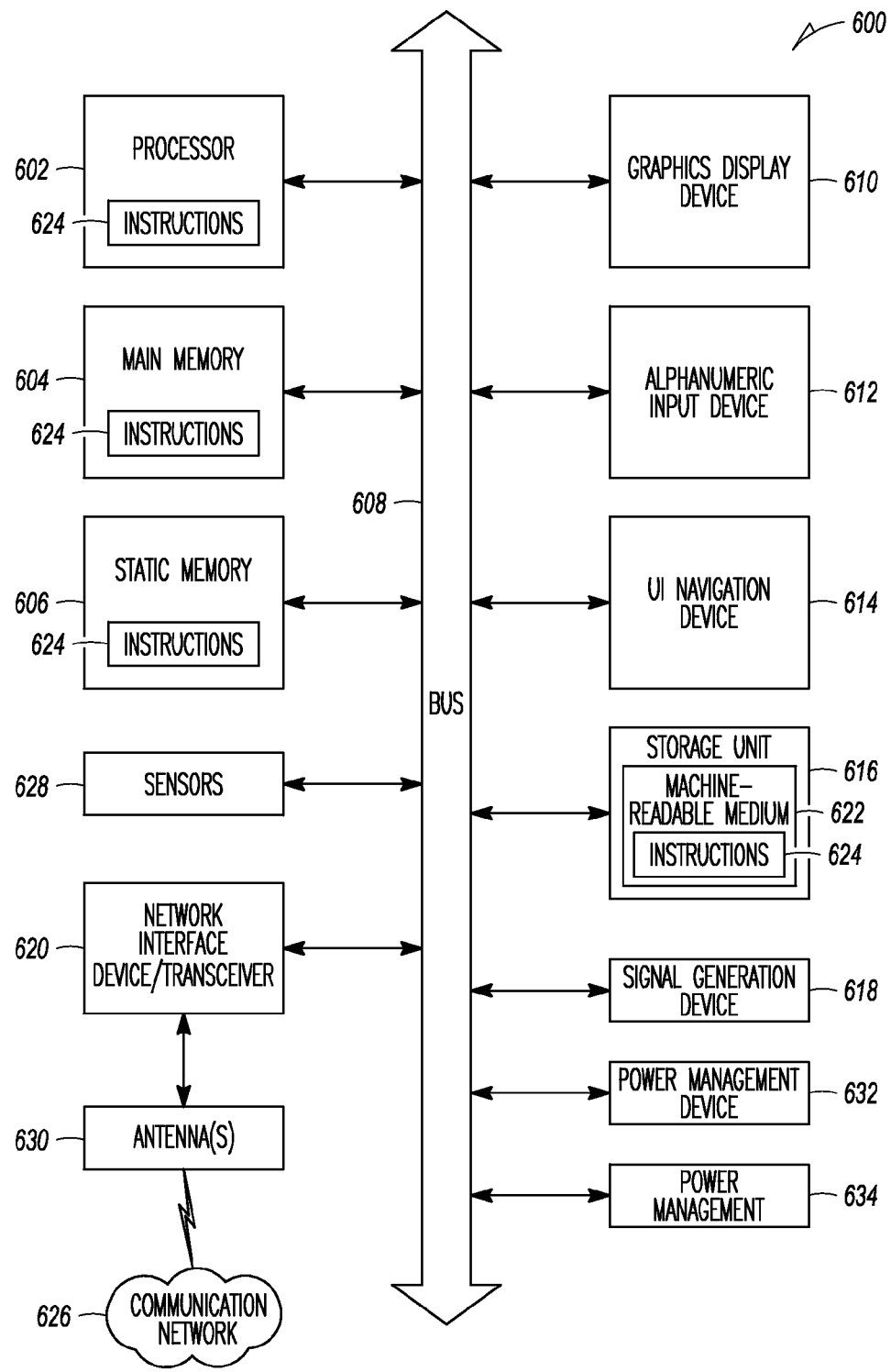
FIG. 6 shows a block diagram of an example of a machine upon which, any of one or more techniques (e.g., methods) discussed herein may be performed.

FIG. 6 illustrates a block diagram of an example of a machine 600 upon which any one or more of the techniques (e.g., methodologies) discussed herein may be performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612 and UI navigation device 614 may be a touch screen display. The machine 600 may additionally include a storage device (i.e., drive unit) 616, a signal generation device 618 (e.g., a speaker), a network interface device/transceiver 620 coupled to antenna(s) 630, and one or more sensors 628, such as a global positioning system (GPS) sensor, compass, accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions 624 for execution by the machine 600 and that cause the machine 600 to perform any one or more of the techniques of the present disclosure, or that is capable of storing, encoding or carrying data structures used by or associated with such instructions 624. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas 630 to connect to the communications network 626. In an example, the network interface device/transceiver 620 may include a plurality of antennas 630 to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions 624 for execution by the machine 600, and includes digital or analog communications signals or other intangible media to facilitate communication of such software.

In one embodiment, a User Equipment (UE) comprises a processor and transceiver configured to receive, on a Licensed Shared Access (LSA) frequency band, a broadcast paging message indicating transmission of a System Information Block 2 (SIB2) carrying Radio Resource Control (RRC) information in a next modification period, receive, in a next modification period on the LSA frequency band, the SIB2, wherein the radio resource control information comprises a list of excluded Secondary-Cell(s) (SCells), read the list of excluded SCells, and reconfigure RRC connection information to release SCells identified in the list of excluded SCells.

In another embodiment, a non-transitory computer readable storage device includes instructions stored thereon, which when executed by a machine, cause the machine to perform operations to receive, on a Licensed Shared Access (LSA) frequency band, a broadcast paging message indicating transmission of a System Information Block 2 (SIB2) carrying Radio Resource Control (RRC) information in a next modification period, receive, in a next modification period on the LSA frequency band, the SIB2, wherein the radio resource control information comprises a list of excluded Secondary-Cell(s) (SCells), read the list of excluded SCells, and reconfigure RRC connection information to release SCells identified in the list of excluded SCells.

In another embodiment, an Evolved Node B (eNB) comprises hardware processing circuitry configured to transmit, on a Licensed Shared Access (LSA) frequency band, a broadcast paging message indicating transmission of a System Information Block 2 (SIB2) carrying Radio Resource Control (RRC) information in a next modification period and transmit, in a next modification period on the LSA frequency band, the SIB2, wherein the radio resource control information comprises a list of excluded Secondary-Cell(s) (SCells).

In yet another embodiment, a method for simultaneous Secondary-Cell (SCell) release comprises enhancing a System Information Block 2 (SIB2) to include a field comprising a list of Secondary-Cell(s) for release.

What is claimed is:

1. A User Equipment (UE) comprising a processor and transceiver configured to:
   receive, on a Licensed Shared Access (LSA) frequency band, a broadcast paging message indicating transmission of a System Information Block 2 (SIB2) carrying Radio Resource Control (RRC) connection information in a next modification period;
   receive, in the next modification period on the LSA frequency band, the SIB2, wherein the RRC connection information comprises a list of excluded Secondary-Cell(s) (SCells); and
   reconfigure the RRC connection information to release SCells identified in the list of excluded SCells.

2. The UE of claim 1 wherein the SIB2 comprises a populated excluded SCells list field.

3. The UE of claim 1 further configured to receive a SIB2 comprising a "excluded-SCells-field"for listing SCells to be released.

4. The UE of claim 1 further configured to determine that SCells identified in the list of excluded SCells are unavailable unless the UE receives an explicit availability message.

5. The UE of claim 1 further configured to take no action when the list of excluded SCells is empty.

6. The UE claim of 1 further configured to receive a paging message having a systemInfoModification flag field set to indicate an upcoming change of sCell availability.

7. The UE of claim 1 further configured to retain a primary LSA frequency band connection to a Primary Cell(PCell).

8. The UE of claim 1 further configured to transmit a "RRCConnectionReconfigurationComplete"message after reconfiguring the RRC connection information to release SCells identified in the list of excluded SCells.

9. The UE claim 1 further configured to receive, for robustness, a second or third transmission of SIB2 information.

10. The UE claim 1 further configured to minimize over-the-air signaling overhead by receiving the paging message and SIB2 information rather than an individual reconfiguration message.

11. A method for simultaneous Secondary-Cell (SCell) release comprising:
    configuring a System information Block 2 (SIB2) to include a field comprising a list of SCells for release, wherein at least one of:
    the field comprising, the list of SCells for release is an "exeluded-SCells-field",
    the SIB2 is enhanced by including an "excluded-SCells-field"in a "System InformationBlockType2-v9e0-IEs-"data structure,
    the list of SCells for release is populated during Licensed Shared Access (LSA) frequency band reclamation by an incumbent, and
    the list of SCells for release is optional.

12. The method of claim 11 wherein the field comprising the list of SCells for release is an "exeluded-SCells-field".

13. The method of claim 11 wherein the SIB2 is enhanced by including an "excluded-SCells-field"in a "SysteminformationBlockType2-v9e0-IEs"data structure.

14. The method of claim 11 wherein the list of SCells for release is populated during Licensed Shared Access (LSA) frequency band reclamation by an incumbent.

15. The method of claim 11 wherein the list of SCells for release is optional.

16. A non-transitory computer readable storage device including instructions stored thereon, which when executed by one or more processor(s) of a User Equipment (UE), cause the UE to perform operations to:
    receive, on a Licensed Shared Access (LSA) frequency band, a broadcast paging message indicating transmission of a System : Information Block 2 (SIB2) carrying Radio Resource Control (RRC) connection information in a next modification period;

receive, in a next modification period on the LSA frequency band, the SIB2, wherein the RRC connection information comprises a list of excluded Secondary-Cell(s) (SCells);

read the list of excluded SCells; and reconfigure the RRC connection information to release SCells identified in the list of excluded SCells.

17. An Evolved Node B (eNB) comprising hardware processing circuitry configured to:

transmit, on a Licensed Shared Access LSA) frequency band, a broadcast paging message indicating transmission of a System Information Block 2 (SIB2) carrying Radio Resource Control (RRC) connection information in a next modification period; and transmit, in a next modification period on the LSA frequency band, the SIB2,wherein the RRC connection information comprises a list of excluded Secondary-Cell(s) (SCells).

18. The eNB of claim 17 further configured to transmit a SIB2 comprising an "excluded-SCells-field"for listing SCells to be released.

19. The eNB of claim 17 further configured to transmit the SIB2 multiple times.

20. The eNB of claim 17 further configured to reduce signaling overhead by removing the list of excluded SCells from later transmissions of SIB2s.

* * * * *